United States Patent Office 3,437,403
Patented Apr. 8, 1969

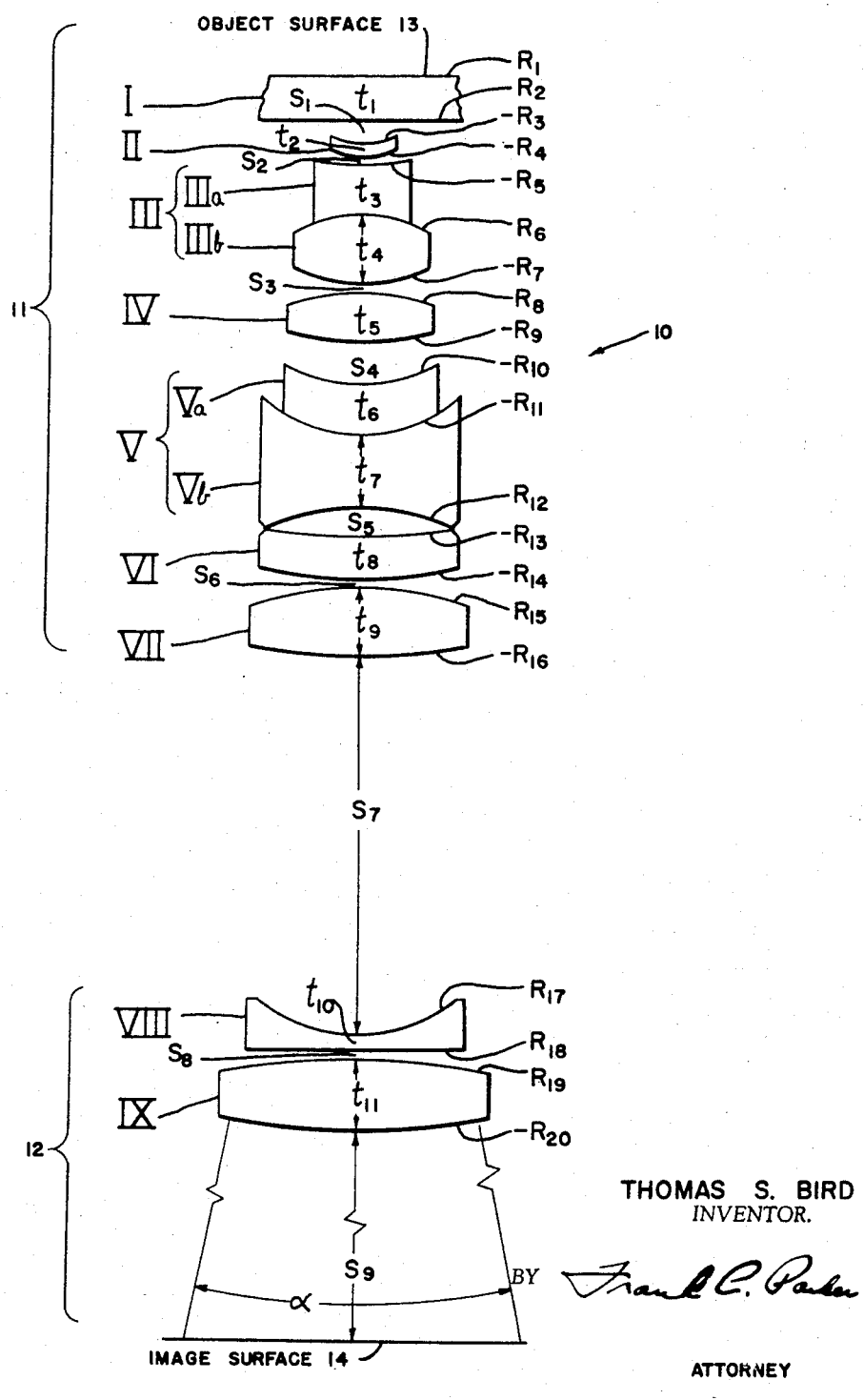

3,437,403
LARGE APERTURE, HIGH MAGNIFICATION REVERSED TELEPHOTO PROJECTION OBJECTIVE
Thomas S. Bird, Rochester, N.Y., assignor to Bausch & Lomb Incorporated, Rochester, N.Y., a corporation of New York
Filed July 13, 1966, Ser. No. 564,884
Int. Cl. G02b 9/64, 17/02
U.S. Cl. 350—204                    5 Claims The present invention relates to an image-forming optical system such as a projection objective of the reversed telephoto type and more particularly it relates to improvements in complex forms of such objectives which are used at high magnification.

Such an objective is quite uncommon when used in other than photographic apparatus, such as cameras, and in the present device the reversed telephoto high magnification projection lens is working at finite conjugates to produce an image magnification of substantially 150×. Usually objectives intended for copy apparatus have been characterized by a symmetrical form or nearly so whereby the imagery at near unity magnification is guaranteed. Due to the fact that the projection objective in the present invention is used at substantially 150× the reversed telephoto type of optical system lends itself very well to the solution of the problem, the objective nevertheless being used in the manner of a microscope objective wherein the numerical aperture is extraordinarily high, the value thereof being substantially .42. Therefore, the reversed telephoto system instead of being used in its usual form with one conjugate at infinity, the wide angle or long conjugate side of the projection lens has a finite focus while the object space of the lens system is quite large compared to microscope objectives of similar form. The object space always includes a relatively thick cover glass between the object surface and the front lens of the optical system.

In view of the above-mentioned facts, it may be stated that the principal object of the present invention is to provide a reversed telephoto lens system which works at unequal conjugates having a high ratio, and wherein the numerical aperture on the object side of the system is extremely large in the order of .42.

It is a further object of this invention to produce such a device which is distinguished by an excellent flatness of field and a very high resolution over the entire format on the image side.

A further object is to provide such a device which achieves an extraordinarily large numerical aperture and magnification without adding excessive spherical aberration to the image, and wherein a relatively long working distance is achieved in this type of optical system.

A still further object is to provide such a device having an adequately large field while being adjustable in certain air spaces and lens thicknesses to provide a correction for achieving superior image quality.

Further objects and advantages will be apparent in the combination and arrangement of the parts of the aforesaid optical system and in the details of construction thereof by reference to the drawing wherein the single figure illustrates one preferred form of the present invention.

The preferred form of the invention as set forth hereinafter relates to a projector objective of the reversed telephoto type having a large numerical aperture of substantially .42 and a magnification of substantially 150×.

With reference to the drawing, the optical system is generally made up of two optically aligned functional groups of lenses which are a front positive or main lens group 11, and a rear wide angle lens group 12 and said system is designated by the numeral 10. Said front lens group 11 is composed on the object side of a front member which is designated I and is a parallel plano cover glass lying in contact with the object surface 13. Spaced rearwardly from the cover glass I by an axial distance designated $S_1$ is a positive meniscus lens designated II which is concave toward the cover glass.

Rearwardly of the lens II is axially spaced an achromatized doublet positive menisucs lens at an axial distance designated $S_2$, said doublet comprising a front double concave lens element designated IIIa which lies in contact with a double convex lens element designated IIIb.

Closely spaced behind said doublet is a double convex singlet lens designated IV positioned at an axial distance $S_3$ therefrom.

An unusually constructed double concave doublet lens designated V is spaced rearwardly of lens IV at an axial distance designated $S_4$. As explained hereinafter, this compound lens V is so constructed as to contribute an important amount of improvement in spherical aberration of the image and flatness of the field for the objective 10. Doublet V is composed of a front positive meniscus lens element designated Va which lies in contact with a double concave rear lens element designated Vb.

To the rear of lens V is spaced a positive menisucs singlet lens at an axial distance designated $S_5$, said singlet being designated VI. Rearmost in lens group 11 is a double convex singlet lens designated VII which is spaced from lens VI by an axial distance designated $S_6$.

Two singlets are comprised in the dispersive lens group 12, and said group is spaced at a large axial distance designated $S_7$ from front lens group 11, the front singlet being preferably of plano concave form with its concave surface facing lens VII and being identified by VIII. The second singlet is double convex in form and is designated IX, this singlet being spaced from lens VIII by an axial space designated $S_8$.

An image is formed of the object surface 13 by the entire objective 10 on the image surface 14, said image having superior flatness and very high resolution over the entire format. A comparatively large field angle $\alpha$ of substantially 23° is formed on the image side of the objective 10. One of the most impressive characteristics of the objective 10 is the high numerical aperture having a value of at least .42. This advantage is achieved by a combination of lens parameters chosen by computation and experimentation and combined as set forth subsequently in tables of values herebelow.

The equivalent focal lengths of the front and rear lens groups 11 and 12 are designated $F_{11}$ and $-F_{12}$ respectively and have values substantially as follows in terms of F which represents the equivalent focal length of the entire objective 10.

$$F_{11}=2.05F$$
$$-F_{12}=4.14F$$

With regard to the aforesaid lens members I to IX, the corresponding equivalent focal lengths therefor are designated $F_I$ to $F_{IX}$ and some of these designations are accompanied by a minus (—) sign indicating negative focal lengths. The theoretical values in terms of F for the focal lengths $F_I$ to $F_{IX}$ are given in Table I herebelow.

Table I $F_I = \infty$
$F_{II} = 25.0F$
$F_{III} = 5.8F$
$F_{IV} = 1.97F$
$-F_V = 1.46F$
$F_{VI} = 13.23F$
$F_{VII} = 3.23F$
$-F_{VIII} = 2.42F$
$F_{IX} = 6.81F$ Compound lens members III and V which are made up respectively by elements IIIa and IIIb, and by elements Va and Vb, have individual focal lengths which are designated $-F_{IIIa}$, $F_{IIIb}$ and $F_{Va}$ and $-F_{Vb}$. The values thereof are given substantially in Table II below.

Table II $-F_{IIIa} = 1.23F$
$F_{IIIb} = 1.26F$ or $-F_{IIIa}/F_{IIIb} = .97$ (numerically)

$F_{Va} = 8.85F$
$F_{Vb} = 1.39F$ or $F_{Va}/-F_{Vb} = 6.37$ (numerically)

Due to the method of manufacture and assembly used for the objective 10, all of the above nominal values may in practice be varied by a small amount from the nominal or ideal values as given in the foregoing or succeeding tables. In the aforesaid method, comparatively large numbers of each lens element in the objective are produced according to good manufacturing standards having practical limits suitable for large scale production. The resultant non-ideal lens parts depart slightly from the true nominal values as given in the specification and are evaluated as indicated in certain of the tables appearing hereinafter. Particularly the air spaces and lens thicknesses may be adjusted slightly by a skilled optician in such a way as to restore good optical performance to the objective. With a multiplicity of lens parts having varying lens parameters available to skilled operators, it is therefore possible to successfully assemble a large proportion of non-ideal objectives which perform well optically and are commercially acceptable.

In view of the foregoing explanation, the nominal values are given in terms of F for the successive lens radii $R_1$ to $R_{20}$ in the following Tables III and IV, the minus (—) sign used with certain R values referring to lens surfaces which are concave toward the object 13.

Table III (Lens II):
$-R_3/-R_4 = .93$ (numerical ratio)
(Lenses IIIa and IIIb):
$-R_5/-R_7 = 1.53$ (numerical ratio)
$-R_5/R_6 = 2.59$ (numerical ratio)
(Lens IV):
$R_8/-R_9 = .84$ (numerical ratio)
(Lenses Va and Vb):
$-R_{10}/-R_{11} = 1.15$ (numerical ratio)
$-R_{10}/R_{12} = .82$ (numerical ratio)
(Lens VI):
$-R_{13}/-R_{14} = 1.68$ (numerical ratio)
(Lens VII):
$R_{15}/-R_{16} = .64$ (numerical ratio)
(Lens VIII):
$R_{17} = 1.67F$
$R_{18} > \pm 15.0F$
(Lens IX):
$R_{19}/-R_{20} = 2.4$ (numerical ratio)

Table IV $R_1 = $ Plano
$R_2 = $ Plano
$.024 < S_3 < .041F$
$-R_4 = .97F$
$-R_5 = 2.8F$
$R_6 = 1.4F$
$-R_7 = 1.81F$
$R_8 = 2.38F$
$-R_9 = 2.83F$
$-R_{10} = 1.81F$
$-R_{11} = 1.58F$
$R_{12} = 2.21F$
$-R_{13} = 6.81F$
$-R_{14} = 4.01F$
$R_{15} = 3.56F$
$-R_{16} = 5.55F$
$R_{17} = 1.67F$
$R_{18} > \pm 15.0F$
$R_{19} = 16.74F$
$-R_{20} = 6.98F$ Furthermore, in accordance with the foregoing explanation regarding lens parameter values, the ranges of values for the successive air spaces $S_1$ to $S_9$ and lens thicknesses $t_1$ to $t_{11}$ are given in Table V herebelow.

Table V $.193F < S_1 < .198F$
$.024F < S_2 < .041F$
$.024F < S_3 < .041F$
$.361F < S_4 < .426F$
$.254F < S_5 < .320F$
$.018F < S_6 < .025F$
$4.04F < S_7 < 4.12F$
$.041F < S_8 < .057F$
$141.0F < S_9 < 147.0F$
$.508F < t_1 < .517F$
$.286F < t_2 < .296F$
$.533F < t_3 < .560F$
$.735F < t_4 < .750F$
$.620F < t_5 < .635F$
$.573F < t_6 < .583F$
$.722F < t_7 < .733F$
$.468F < t_8 < .484F$
$.647F < t_9 < .673F$
$.151F < t_{10} < .177F$
$.744F < t_{11} < .792F$ With respect to the refractive index $n_D$ and Abbe number $\nu$ of the glasses from which the lens parts I to IX are made, the ranges of absolute values therefor are given in Table VI herebelow,

Table VI $1.520 < n_D(I) < 1.530$    $54.0 < \nu(I) < 63.0$
$1.688 < n_D(II) < 1.694$    $51.0 < \nu(II) < 58.0$
$1.717 < n_D(IIIa) < 1.723$    $26.0 < \nu(IIIa) < 32.0$
$1.688 < n_D(IIIb) < 1.694$    $51.0 < \nu(IIIb) < 58.0$
$1.688 < n_D(IV) < 1.694$    $51.0 < \nu(IV) < 58.0$
$1.688 < n_D(Va) < 1.694$    $51.0 < \nu(Va) < 58.0$
$1.614 < n_D(Vb) < 1.620$    $33.0 < \nu(Vb) < 40.0$
$1.688 < n_D(VI) < 1.694$    $51.0 < \nu(VI) < 58.0$
$1.688 < n_D(VII) < 1.694$    $51.0 < \nu(VII) < 58.0$
$1.688 < n_D(VIII) < 1.694$    $51.0 < \nu(VIII) < 58.0$
$1.717 < n_D(IX) < 1.723$    $26.0 < \nu(IX) < 32.0$ With regard to the nominal absolute values of the $n_D$ and quantities, the numerical relationships therebetween for the elements of lens members III and IV as well as between lens members VIII and IX are given in Table VII herebelow,

Table VII $n_D(IIIa) - n_D(IIIb) = .029$
$n_D(Va) - n_D(Vb) = .074$
$n_D(VIII) - n_D(IX) = .029$
$\nu(IIIb) - \nu(IIIa) = 25.5$
$\nu(Va) - \nu(Vb) = 18.2$
$\nu(VIII) - \nu(IX) = 25.5$ In this reversed order sequence, the positive lens element has highest $n_D$ value whereby field flatness and spherical aberration of the image is improved as aforesaid.

The nominal values in the preferred objective 10 in terms of F for the air spaces $S_1$ to $S_9$ and lens thicknesses $t_1$ to $t_{11}$ are given in Table VIII herebelow,

Table VIII

| | |
|---|---|
| $S_1 = .20F$ | $t_1 = .51F$ |
| $S_2 = .032F$ | $t_2 = .29F$ |
| $S_3 = .032F$ | $t_3 = .54F$ |
| $S_4 = .39F$ | $t_4 = .74F$ |
| $S_5 = .28F$ | $t_5 = .62F$ |
| $S_6 = .02F$ | $t_6 = .58F$ |
| $S_7 = 4.07F$ | $t_7 = .73F$ |
| $S_8 = .049F$ | $t_8 = .47F$ |
| $S_9 = 144.0F$ | $t_9 = .66F$ |
| | $t_{10} = .16F$ |
| | $t_{11} = .76F$ |

Furthermore, the nominal absolute values of the refractive index $n_D$ and Abbe number $\nu$ for the glasses in the successive lens parts I to IV are given in Table IX herebelow,

Table IX

| | |
|---|---|
| $n_D(I) = 1.526$ | $\nu(I) = 58.7$ |
| $n_D(II) = 1.691$ | $\nu(II) = 54.8$ |
| $n_D(IIIa) = 1.720$ | $\nu(IIIa) = 29.3$ |
| $n_D(IIIb) = 1.691$ | $\nu(IIIb) = 54.8$ |
| $n_D(IV) = 1.691$ | $\nu(IV) = 54.8$ |
| $n_D(Va) = 1.691$ | $\nu(Va) = 54.8$ |
| $n_D(Vb) = 1.617$ | $\nu(Vb) = 36.6$ |
| $n_D(VI) = 1.691$ | $\nu(VI) = 54.8$ |
| $n_D(VII) = 1.691$ | $\nu(VII) = 54.8$ |
| $n_D(VIII) = 1.691$ | $\nu(VIII) = 54.8$ |
| $n_D(IX) = 1.720$ | $\nu(IX) = 29.3$ |

It will be preceived from the foregoing description that there is here provided a wide angle type of projection objective of reversed telephoto kind having a high magnification and abnormally high numerical aperture, similar in use to a microscope objective, and that compared in microscope objectives of 150× magnification the angular field of 23° is relatively large. It will further be evident that the field is remarkably flat over the entire format and the superior resolution of said objective is a chief characteristics thereof.

Although only one form of the present invention has been shown and described in detail, an infinite number of variations of the preferred form having near-nominal values of lens parameters may be constructed which result in good optical performance as aforesaid.

I claim:
1. An image forming optical projection system of the reversed telephoto type working at finite conjugates and having a high magnification and numerical aperture of substantially 150× and .42 respectively and a total field angle at least as great as 23° along with an excellent high resolution and very flat field over the entire format, said system having a collective front lens group optically aligned with a rear dispersive group, said collective group including a plane parallel cover glass lying substantially in contact with the surface of an object to be projected and designated I, a negative meniscus lens member designated II and spaced from cover glass I and being concave thereto, a positive meniscus doublet lens member which is spaced from and is concave toward member II, said doublet being composed of a front double concave element designated IIIa which lies in contact with a double convex element designated IIIb, a double convex lens member spaced rearwardly from said doublet and designated IV, a double concave doublet lens member spaced from member IV and composed of a front positive meniscus lens element designated Va and a double concave lens element lying in contact therewith and designated Vb, a positive meniscus singlet lens member spaced axially from the last doublet lens member and being concave thereto, said member being designated VI and being in close proximity at the edge with the edge of the second doublet, a double convex lens member designated VII and spaced from member VI, said dispersive lens group including a negative singlet lens designated VIII which is widely spaced rearwardly from member VII and is concave thereto, said dispersive group further including a rearmost double convex lens designated IX which is spaced rearwardly from lens element VIII at an axial distance designated $S_8$ and at a projection distance designated $S_9$ from the image produced by said system, the values of the equivalent focal lengths $F_I$ to $F_{IX}$ respectively of the successive lens members I to IX being given substantially in the tables herebelow in terms of F which represents the equivalent focal length of said system wherein the minus (—) sign indicates negative focal length, $$F_I = \infty$$
$$F_{II} = 25.0F$$
$$F_{III} = 5.8F$$
$$F_{IV} = 1.97F$$
$$-F_V = 1.46F$$
$$F_{VI} = 13.23F$$
$$F_{VII} = 3.23F$$
$$-F_{VIII} = 2.42F$$
$$F_{IX} = 6.81F$$

the lens elements II, IIIb, IV, Va, VI, VII and VIII being made of the same kind of glass which has a refractive index absolute value between 1.688 and 1.694, and has an Abbe number absolute value between 51.0 and 58.0, the lens elements IIIa, Va and IX having a refractive index $n_D$ values respectively which are stated herebelow, $$n_D(IIIa) - n_D(IIIb) = .029$$
$$n_D(Va) - n_D(Vb) = .074$$
$$n_D(IX) - n_D(VIII) = .029$$

the lens elements IIIa, Va and IX having absolute values for the Abbe numbers $\nu$ respectively which are stated herebelow, $$\nu(IIIb) - \nu(IIIa) = 25.0$$
$$\nu(Va) - \nu(Vb) = 18.0$$
$$\nu(VIII) - \nu(IX) = 25.0$$

the successive lens parts II to IX having air spaces $S_1$ to $S_9$ therebetween rearwardly of the cover glass I, which have values stated in terms of F in the table herebelow, $$.193F < S_1 < .198F$$
$$.024F < S_2 < .041F$$
$$.024F < S_3 < .041F$$
$$.361F < S_4 < .426F$$
$$.254F < S_5 < .320F$$
$$.018F < S_6 < .025F$$
$$4.04F < S_7 < 4.12F$$
$$.041F < S_8 < .057F$$
$$141.0F < S_9 < 147.0F$$

the successive optical parts I to IX having values in terms of F for the axial thicknesses $t_1$ to $t_{11}$ respectively which are given in the table herebelow, .508F<$t_1$<.517F
.286F<$t_2$<.296F
.533F<$t_3$<.560F
.735F<$t_4$<.750F
.620F<$t_5$<.635F
.573F<$t_6$<.583F
.722F<$t_7$<.733F
.468F<$t_8$<.484F
.647F<$t_9$<.673F
.151F<$t_{10}$<.177F
.744F<$t_{11}$<.792F 2. An image forming optical projection system substantially as set forth in claim 1 further characterized by the focal lengths $-F_{IIIa}$ and $F_{IIIb}$ of the lens elements IIIa and IIIb respectively comprised in lens member III having values which are related numerically to each other as stated in the expression herebelow, $$-F_{IIIa}/F_{IIIb}=.97$$

and the focal lengths $F_{Va}$ and $-F_{Vb}$ of the lens elements Va and Vb respectively comprised in lens member V having values which are related numerically to each other as stated in the expression herebelow, $$F_{Va}/-F_{Vb}=6.37$$

3. An image forming optical projection system of the reversed telephoto type working at finite conjugates and having a high magnification and numerical aperture of substantially 150× and .42 respectively and a total field angle at least as great as 23° along with an excellent high resolution and very flat field over the entire format, said system having a collective front lens group optically aligned with a rear dispersive group, said collective group including
a plane parallel cover glass lying substantially in contact with an object to be projected and designated I,
a negative meniscus lens member designated II and spaced from cover glass I and being concave thereto,
a positive meniscus doublet lens member which is spaced from and is concave toward member II, said doublet being composed of a front double concave element designated IIIa which lies in contact with a double convex element designated IIIb,
a double convex lens member spaced rearwardly from said doublet and designated IV,
a double concave doublet lens member spaced from member IV and composed of a front positive meniscus lens element designated Va and a double concave lens element lying in contact therewith and designated Vb,
a positive meniscus singlet lens member spaced axially from the last doublet lens member and being concave thereto, said member being designated VI and being in close proximity at the edge with the edge of the second doublet,
a double convex lens member designated VII and spaced from member VI,
said dispersive lens group including a negative singlet lens designated VIII which is widely spaced rearwardly from member VII and is concave thereto, said dispersive group further including
a rearmost double convex lens designated IX which is spaced rearwardly from lens element VIII at an axial distance designated $S_8$ and at a projection distance designated $S_9$ from the image produced by said system,
the values of the radii of the successive refractive surfaces $R_1$ to $-R_{20}$ on the successive optical elements I to IX being related to each other as stated in the table herebelow, the minus (−) sign referring to all refractive surfaces which are concave toward the object, $-R_3/-R_4$=.93 substantially (numerically)
$-R_5/-R_7$=1.53 substantially (numerically)
$-R_5/R_6$=2.59 substantially (numerically)
$R_8/-R_9$=.84 substantially (numerically)
$-R_{10}/-R_{11}$=1.15 substantially (numerically)
$-R_{10}/R_{12}$=.82 substantially (numerically)
$-R_{13}/-R_{14}$=1.68 substantially (numerically)
$R_{15}/-R_{16}$=.64 substantially (numerically)
$R_{17}$=1.67F substantially (numerically)
$R_{18}$>±20.0F substantially (numerically)
$R_{19}/-R_{20}$=2.4 substantially (numerically)

the lens elements II, IIIb, IV, Va, VI, VII and VIII being made of the same kind of glass which has a refractive index absolute value between 1.688 and 1.694, and has an Abbe number absolute value between 51.0 and 58.0,
the lens elements IIIa, Va and IX having a refractive index $n_D$ values respectively which are stated herebelow, $n_D$(IIIa)$-n_D$(IIIb)=.029
$n_D$(Va)$-n_D$(Vb)=.074
$n_D$(IX)$-n_D$(VIII)=.029 the lens elements IIIa, Va and IX having absolute values for the Abbe numbers respectively which are stated herebelow, $\nu$(IIIb)$-\nu$(IIIa)=25.5
$\nu$(Va)$-\nu$(Vb)=18.2
$\nu$(VIII)$-\nu$(IX)=25.5 the successive lens parts II to IX having air spaces $S_1$ to $S_9$ therebetween rearwardly of the cover glass I, which have values stated in terms of F in the table herebelow, .193F<$S_1$< .198F
.024F<$S_2$< .041F
.024F<$S_3$< .041F
.361F<$S_4$< .426F
.254F<$S_5$< .320F
.018F<$S_6$< .025F
4.04F<$S_7$< 4.12F
.041F<$S_8$< .057F
141.0F<$S_9$<147.0F the successive optical parts I to IX having values in terms of F for the axial thicknesses $t_1$ to $t_{11}$ respectively which are given in the table herebelow, .508F<$t_1$ <.517F
.286F<$t_2$ <.296F
.533F<$t_3$ <.560F
.735F<$t_4$ <.750F
.620F<$t_5$ <.635F
.573F<$t_6$ <.583F
.722F<$t_7$ <.733F
.468F<$t_8$ <.484F
.647F<$t_9$ <.673F
.151F<$t_{10}$<.177F
.744F<$t_{11}$<.792F 4. An image forming optical projection system of the reversed telephoto type working at finite conjugates and having a high magnification and numerical aperture of substantially 150× and .42 respectively and a total field angle at least as great as 23° along with an excellent high resolution and very flat field over the entire format, said system having a collective front lens group optically aligned with a rear dispersive group, said collective group including
a plane parallel cover glass lying substantially in contact with an object to be projected and designated I,
a negative meniscus lens member designated II and spaced from cover glass I and being concave thereto,
a positive meniscus doublet lens member which is spaced from and is concave toward member II, said doublet being composed of a front double concave element designated IIIa which lies in contact with a double convex element designated IIIb, a double convex lens member spaced rearwardly from said doublet and designated IV, a double concave doublet lens member spaced from member IV and composed of a front positive meniscus lens element designated Va and a double concave lens element lying in contact therewith and designated Vb, a positive meniscus singlet lens member spaced axially from the last doublet lens member and being concave thereto, said member being designated VI and being in close proximity at the edge with the edge of the second doublet, a doublet convex lens member designated VII and spaced from member VI, said dispersive lens group including a negative singlet lens designated VIII which is widely spaced rearwardly from member VII and is concave thereto, said dispersive group further including a rearmost double convex lens designated IX which is spaced rearwardly from lens element VIII at an axial distance designated $S_8$ and at a projection distance designated $S_9$ from the image produced by said system, the values of the equivalent focal lengths $F_I$ to $F_{IX}$ respectively of the successive lens members I to IX being given substantially in the tables herebelow in terms of F which represents the equivalent focal length of said system wherein the minus (—) sign indicates negative focal length, $F_I = \infty$         $F_{VI} = 13.23F$
$F_{II} = 25.0F$       $F_{VII} = 3.23F$
$F_{III} = 5.8F$       $-F_{VIII} = 2.42F$
$F_{IV} = 1.97F$       $F_{IX} = 6.81F$
$-F_V = 1.46F$ the successive axial air spaces $S_1$ to $S_9$ between the optical parts I to IX of said system having values in terms of F substantially as given in the table herebelow, $S_1 = .20F$
$S_2 = .032F$
$S_3 = .032F$
$S_4 = .39F$
$S_5 = .28F$
$S_6 = .02F$
$S_7 = 4.07F$
$S_8 = .049F$
$S_9 = 144.0F$ the values in terms of F of axial thicknesses $t_1$ to $t_{11}$ of the optical parts I to IX respectively being given substantially in the table herebelow, $t_1 = .51F$
$t_2 = .29F$
$t_3 = .54F$
$t_4 = .74F$
$t_5 = .62F$
$t_6 = .58F$
$t_7 = .73F$
$t_8 = .47F$
$t_9 = .66F$
$t_{10} = .16F$
$t_{11} = .76F$ the refractive index $n_D$ and Abbe number $\nu$ of the glass from which the successive optical parts I to IX are formed having absolute values substantially as given in the following table, $n_D(I) = 1.526$         $\nu(I) = 58.7$
$n_D(II) = 1.691$        $\nu(II) = 54.8$
$n_D(IIIa) = 1.720$      $\nu(IIIa) = 29.3$
$n_D(IIIb) = 1.691$      $\nu(IIIb) = 54.8$
$n_D(IV) = 1.691$        $\nu(IV) = 54.8$
$n_D(Va) = 1.691$        $\nu(Va) = 54.8$
$n_D(Vb) = 1.617$        $\nu(Vb) = 36.6$
$n_D(VI) = 1.691$        $\nu(VI) = 54.8$
$n_D(VII) = 1.691$       $\nu(VII) = 54.8$
$n_D(VIII) = 1.691$      $\nu(VIII) = 54.8$
$n_D(IX) = 1.720$        $\nu(IX) = 29.3$ 5. An image forming optical projection system of the reversed telephoto type working at finite conjugates and having a high magnification and numerical aperture of substantially 150× and .42 respectively and a total field angle at least as great as 23° along with an excellent high resolution and very flat field over the entire format, said system having a collective front lens group optically aligned with a rear dispersive group, said collective group including a plane parallel cover glass lying substantially in contact with an object to be projected and designated I, a negative meniscus lens member designated II and spaced from cover glass I and being concave thereto, a positive meniscus doublet lens member which is spaced from and is concave toward member II, said doublet being composed of a front double concave element designated IIIa which lies in contact with a double convex element designated IIIb, a double convex lens member spaced rearwardly from said doublet and designated IV, a double concave doublet lens member spaced from member IV and composed of a front positive meniscus lens element designated Va and a double concave lens element lying in contact therewith and designated Vb, a positive meniscus singlet lens member spaced axially from the last doublet lens member and being concave thereto, said member being designated VI and being in close proximity at the edge with the edge of the second doublet, a double convex lens member designated VII and spaced from member VI, said dispersive lens group including a negative singlet lens designated VIII which is widely spaced rearwardly from member VII and is concave thereto, said dispersive group further including a rearmost double convex lens designated IX which is spaced rearwardly from lens element VIII at an axial distance designated $S_8$ and at a projection distance designated $S_9$ from the image produced by said system, the values in terms of F for the successive radii of the optical surfaces being designated $R_1$ to $-R_{20}$ in the table herebelow and the minus (—) sign used with certain R designations signifying those curvatures which have their centers on the object side thereof, $R_1 =$ Plano          $-R_{11} = 1.58F$
$R_2 =$ Plano          $R_{12} = 2.21F$
$-R_3 = .90F$          $-R_{13} = 6.81F$
$-R_4 = .97F$          $-R_{14} = 4.01F$
$-R_5 = 2.80F$         $R_{15} = 3.56F$
$R_6 = 1.40F$          $-R_{16} = 5.55F$
$-R_7 = 1.81F$         $R_{17} = 1.67F$
$R_8 = 2.38F$          $R_{18} > \pm 15.0F$
$-R_9 = 2.83F$         $R_{19} = 16.74F$
$-R_{10} = 1.81F$      $-R_{20} = 6.98F$ the successive axial air spaces $S_1$ to $S_9$ between the optical parts I to IX of said system having values in terms of F substantially as given in the table herebelow, $S_1 = .20F$    $S_6 = .02F$
$S_2 = .032F$   $S_7 = 4.07F$
$S_3 = .032F$   $S_8 = .049F$
$S_4 = .39F$    $S_9 = 144.0F$
$S_5 = .28F$ the values in terms of F of axial thickness $t_1$ to $t_{11}$ of the optical parts I to IX respectively being given substantially in the table herebelow, $t_1 = .51F$    $t_7 = .73F$
$t_2 = .29F$    $t_8 = .47F$
$t_3 = .54F$    $t_9 = .66F$
$t_4 = .74F$    $t_{10} = .16F$
$t_5 = .62F$    $t_{11} = .76F$
$t_6 = .58F$ the refractive index $n_D$ and Abbe number $\nu$ of the glass from which the successive optical parts I to IX are formed having absolute values substantially as given in the following table, $n_D(I) = 1.526$        $\nu(I) = 58.7$
$n_D(II) = 1.691$       $\nu(II) = 54.8$
$n_D(IIIa) = 1.720$     $\nu(IIIa) = 29.3$
$n_D(IIIb) = 1.691$     $\nu(IIIb) = 54.8$
$n_D(IV) = 1.691$       $\nu(IV) = 54.8$
$n_D(Va) = 1.691$       $\nu(Va) = 54.8$
$n_D(Vb) = 1.617$       $\nu(Vb) = 36.6$
$n_D(VI) = 1.691$       $\nu(VI) = 54.8$
$n_D(VII) = 1.691$      $\nu(VII) = 54.8$
$n_D(VIII) = 1.691$     $\nu(VIII) = 54.8$
$n_D(IX) = 1.720$       $\nu(IX) = 29.3$

References Cited

UNITED STATES PATENTS 1,761,441   6/1930   Foster.
3,190,176   6/1965   Buzana.

DAVID SCHONBERG, *Primary Examiner.*

RONALD J. STERN, *Assistant Examiner.*

U.S. Cl. X.R.

350—214

FO-1050
(5/69)

UNITED STATES PATENT OFFICE
CERTIFICATE OF CORRECTION

Patent No. 3,437,403      Dated April 8, 1969

Inventor(s) Thomas S. Bird

It is certified that error appears in the above-identified patent and that said Letters Patent are hereby corrected as shown below:

Column 4, line 5, change "$.024 < S_3 < .041F$" to -- $-R_3 = .90 F$ --

SIGNED AND
SEALED

NOV 4 1969

(SEAL)
Attest:

Edward M. Fletcher, Jr.
Attesting Officer

WILLIAM E. SCHUYLER, JR.
Commissioner of Patents